US012311725B2

(12) United States Patent
Hrecznyj et al.

(10) Patent No.: US 12,311,725 B2
(45) Date of Patent: May 27, 2025

(54) THERMAL MANAGEMENT SYSTEM AND STABILIZER ASSEMBLY FOR A VEHICLE

(71) Applicant: Ford Global Technologies, LLC, Dearborn, MI (US)

(72) Inventors: Michael Hrecznyj, Livonia, MI (US); Michael M. Azzouz, Farmington, MI (US); Scott Nydam, Farmington Hills, MI (US); Marcos Silva Kondrad, Macomb Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 298 days.

(21) Appl. No.: 18/073,825

(22) Filed: Dec. 2, 2022

(65) Prior Publication Data

US 2024/0181833 A1 Jun. 6, 2024

(51) Int. Cl.
*B60H 1/00* (2006.01)
*F25D 11/00* (2006.01)
*F25D 23/10* (2006.01)

(52) U.S. Cl.
CPC ....... *B60H 1/00264* (2013.01); *F25D 11/003* (2013.01); *F25D 23/10* (2013.01); *F25D 2331/804* (2013.01); *F25D 2700/02* (2013.01)

(58) Field of Classification Search
CPC .............. B60H 1/00264; B60H 1/0055; B60H 1/00592; B60N 3/104; F25D 23/10; F25D 2331/804; F25D 2700/02
See application file for complete search history.

(56) References Cited

U.S. PATENT DOCUMENTS

| | | | |
|---|---|---|---|
| 3,850,006 A | | 11/1974 | Redfern et al. |
| 3,916,639 A | * | 11/1975 | Atkinson ............... B60N 3/104 62/331 |
| 4,637,222 A | | 1/1987 | Fujiwara et al. |
| 5,890,613 A | * | 4/1999 | Williams ............. A45C 7/0045 220/23.4 |
| 10,953,721 B2 | | 3/2021 | Gruber |
| 11,148,602 B2 | | 10/2021 | Ahlning |

(Continued)

FOREIGN PATENT DOCUMENTS

| | | |
|---|---|---|
| CN | 102320257 A | 1/2012 |
| DE | 102012204160 A1 | 9/2013 |

(Continued)

OTHER PUBLICATIONS

Tesla Model S Front Trunk (Frunk) Electric Cooler Review, 9 pages, posted on Jan. 31, 2014, www.teslarati.com/tesla-model-s-front-trunk-frunk-cooler/.

*Primary Examiner* — Elizabeth J Martin
(74) *Attorney, Agent, or Firm* — Vichit Chea; Price Heneveld LLP

(57) ABSTRACT

A thermal management system for a vehicle includes a connection interface that is coupled with a compartment of the vehicle and is in fluid communication with a climate control system of the vehicle. A container is movably disposed in the compartment and is in fluid communication with the climate control system via the connection interface. At least one alignment feature is coupled with the compartment and engages at least one sidewall of the container to align the container with the connection interface while the container moves in the compartment.

20 Claims, 4 Drawing Sheets

(56) References Cited

U.S. PATENT DOCUMENTS

| | | | |
|---|---|---|---|
| 2015/0203046 A1* | 7/2015 | Nedelman | B60R 11/06 296/37.7 |
| 2018/0037150 A1 | 2/2018 | Rotharmel | |
| 2020/0108688 A1* | 4/2020 | Gruber | H01M 10/656 |

FOREIGN PATENT DOCUMENTS

| | | |
|---|---|---|
| DE | 102016203084 A1 | 9/2017 |
| DE | 102020135071 A1 | 7/2021 |
| WO | 2021245557 A1 | 12/2021 |

* cited by examiner

THERMAL MANAGEMENT SYSTEM AND STABILIZER ASSEMBLY FOR A VEHICLE

FIELD OF THE DISCLOSURE

The present disclosure generally relates to a thermal management system and stabilizer assembly for a vehicle and, more particularly, to a movable cooler that is selectively coupled with a compartment of the vehicle.

BACKGROUND OF THE DISCLOSURE

Compartments for vehicles can be climate controlled. For example, some compartments may be configured for heating or cooling items in the compartment. Alternatively, a climate controlled case may be disposed in a dedicated location in the vehicle. However, conventional climate controlled cases do not typically couple with onboard heating or cooling devices associated with the vehicle. Further, typical climate-controlled cases are not selectively expandable or concealable in a region of the vehicle. A need is presented for a dynamic arrangement that allows for both space optimization and effective portability.

SUMMARY OF THE DISCLOSURE

According to a first aspect of the present disclosure, a thermal management system for a vehicle includes a connection interface that is coupled with a compartment of the vehicle and is in fluid communication with a climate control system of the vehicle. A container is movably disposed in the compartment and is in fluid communication with the climate control system via the connection interface. At least one alignment feature is coupled with the compartment and engages at least one sidewall of the container to align the container with the connection interface while the container moves in the compartment.

Embodiments of the first aspect of the present disclosure can include any one or a combination of the following features:

the container is configured to selectively engage the connection interface and is removable from the compartment;
  the at least one sidewall includes opposing sidewalls and the at least one alignment feature includes a pair of rails extending upwardly from a floor of the compartment for engaging the opposing sidewalls;
  a groove extending into the floor, and a guide extending from a bottom of the container for engaging the groove to align the container with the connection interface;
  the at least one alignment feature includes a brace extending outwardly from an outer wall of the compartment for engaging the opposing sidewalls;
  a band coupled with the compartment and configured to stretch around the container to bias the container toward the connection interface;
  the at least one alignment feature includes a divider extending from a wall of the compartment to divide the compartment and engage the sidewall along an upper portion of the sidewall;
  the divider includes an extension and the compartment defines a notch configured to receive the extension to limit lateral movement of the divider;
  the divider further includes a lip configured to mate with a ledge disposed along a floor of the compartment;
  the container includes end panels, a casing extending between the end panels, and a rigid linkage between the end panels configured to stabilize the casing;
  the rigid linkage includes a pair of crossing members between the end panels along the at least one sidewall;
  the crossing members form a scissor linkage between the end panels to bias the container in an expanded position, the end panels spaced from one another in the expanded position;
  the container includes a clasping member configured to open and close the container to selectively seal an interior of the container;
  the climate control system includes a sensing device configured to detect one of a temperature and a pressure of the interior; and
  the climate control system further includes a controller in communication with the sensing device, the controller configured to determine an open state of the container based on one of the temperature and the pressure, and communicate an instruction to adjust the fluid communication with the container based on the open state of the container.

According to a second aspect of the present disclosure, a stabilizer assembly of a vehicle for interaction with a portable cooler includes a compartment having a wall. A connection interface is coupled to the wall and is configured to provide fluid communication between an interior of the portable cooler and a climate control system of the vehicle. At least one alignment feature is coupled with the compartment and engages at least one sidewall of the portable cooler to align the portable cooler with the connection interface during a movement of the portable cooler in the compartment.

Embodiments of the second aspect of the present disclosure can include any one or a combination of the following features:

the portable cooler is configured to selectively engage the connection interface;
  the at least one sidewall includes opposing sidewalls and the at least one alignment feature includes a pair of rails extending upwardly from a floor of the compartment for engaging the opposing sidewalls; and
  a groove extending into the floor, and a guide extending from a bottom of the portable cooler for engaging the groove to align the portable cooler with the connection interface.

According to a third aspect of the present disclosure, a thermal management system for a vehicle includes a climate control system which includes a conduit that provides fluid communication between a compartment of the vehicle and a heat control source in the vehicle. A connection interface interposes the conduit and the compartment. A thermally insulated container is movably coupled with the compartment and configured to couple with the connection interface to provide fluid communication between an interior of the container and the climate control system. At least one alignment feature is coupled with the compartment and engages a sidewall of the container to align the container with the connection interface during a movement of the container in the compartment.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
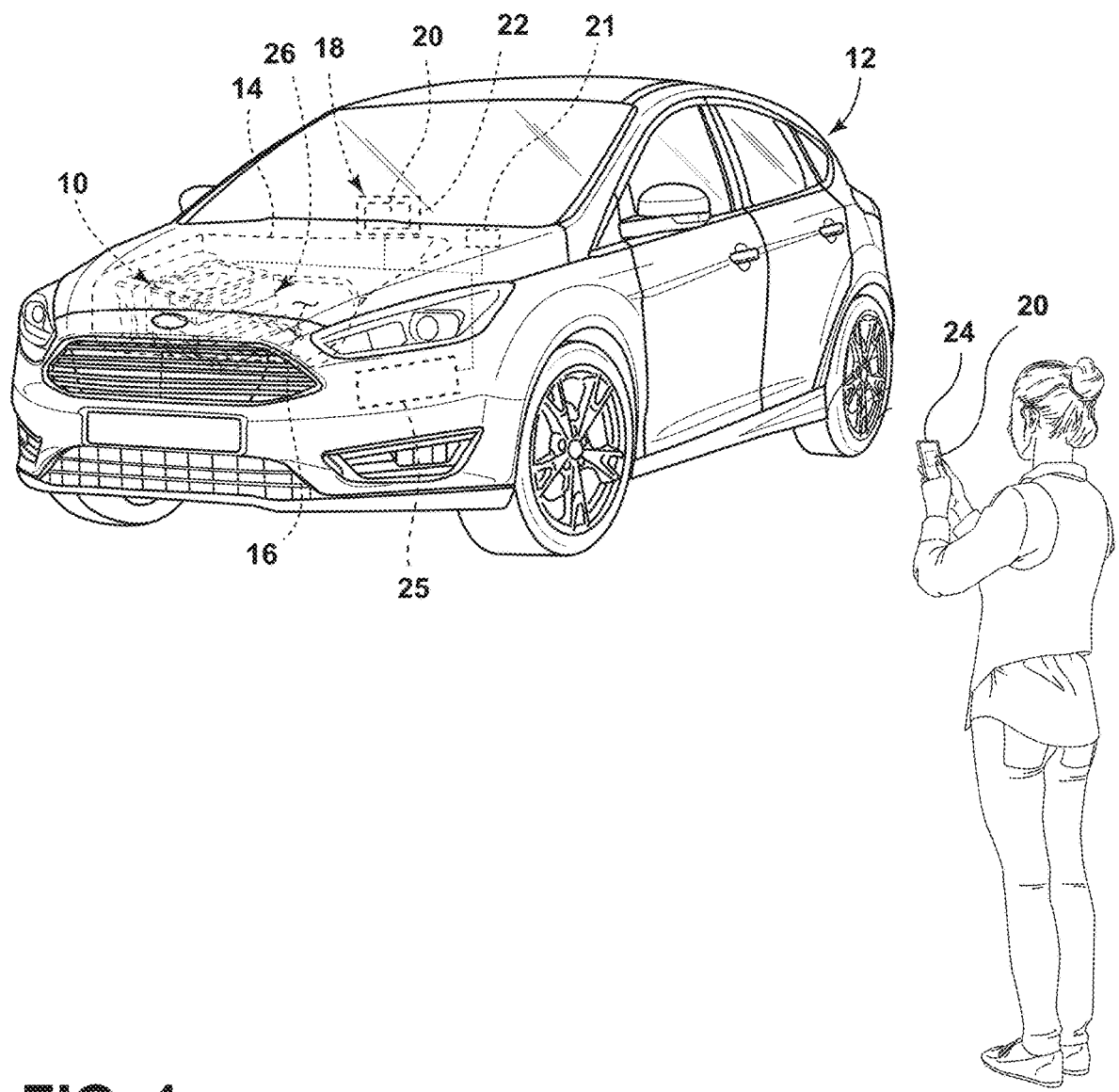
FIG. 1 a perspective view of a vehicle incorporating a thermal management system of the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a thermal management system and a stabilizer arrangement for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In general, the present disclosure may provide for a climate-controlled thermal structure selectively disposed in an interior space of a vehicle. The interior space may be a preformed cavity within the vehicle that is capable of housing the thermal structure, such as a cooler, and securing the thermal structure to a structure that defines the interior space (e.g., an outer wall of the cavity). The thermal structure may be permanently or temporarily secured with the outer wall or otherwise within the interior space, such that the thermal structure may be removable from the interior space or configured to be kept in the interior space. In examples in which the thermal structure may be removed from the interior space (e.g., a portable cooler), an environment of the interior space may be climate-controlled. In this way, environmental conditions of the interior space as a whole and/or environmental conditions of an expandable or removable thermal structure may be controlled.

Referring generally to the figures, the present disclosure provides for a thermal management system 10 for use in a vehicle 12. Although generally illustrated in the figures as being incorporated with a front trunk of the vehicle 12, also commonly referred to as a frunk of an electric vehicle, it is contemplated that the thermal management system 10 of the present disclosure may be incorporated with any compartment 14 of the vehicle 12 and is not limited to the front trunk of the vehicle 12. For example, the compartment 14 may be a passenger compartment, trunk compartment, or any other area or exterior cavity disposed in the vehicle 12. In general, the compartment 14 may form a thermally insulated space 16, which may be climate controlled via a climate control system 18 having at least one interface 20 for controlling environmental attributes of the space 16. For example, the climate control system 18 may be configured to control a temperature, a humidity, an airspeed, or the like in or through the space 16 via a controller 21 of or in communication with the climate control system 18. For example, the controller 21 may be configured to adjust fluid communication between the climate control system 18 and a thermal enclosure. The at least one user interface 20 may be incorporated into a human-machine interface (HMI) 22 associated with a cabin of the vehicle 12 and/or may be incorporated into a mobile device 24, such as a phone, tablet, laptop, etc., for controlling the space 16 while inside or outside of the vehicle 12.

Although not shown in detail, the climate control system 18 may incorporate various heat control devices, such as a heat exchanger, that are configured to interface with the thermal management system 10 of the present disclosure. In some examples, the climate control system 18 includes a heat control source 25 disposed in the vehicle 12 that is configured to control hot or cold air to be delivered to the compartment 14 or the thermal structure. For example, the climate control system 18 may include multiple heat exchangers and/or multiple sub climate control systems that allow isolated or combined control for one or more compartments 14 of the vehicle 12. In general, the climate control system 18 may be configured to provide cool or warm air toward the compartment 14. For example, the climate control system 18 may supply cool air and return warm air in order to reduce the temperature of the compartment 14 or devices in the compartment 14. As will be further described herein, a cooler or other structure may cover inlets and/or outlets of the climate control system 18 in the compartment 14 in order to heat or cool the cooler or other thermal structure.

In some examples, the climate control system 18 includes a dedicated heat pump system or another subsystem such as a heating, ventilation, and air conditioning (HVAC) system of the vehicle 12. In one example, the climate control system 18 is a dedicated dual-box heat pump system (e.g., a compact vehicle thermal management system (CVTMS)). Other exemplary thermal management systems may be employed to provide cool air to a cooler, a thermal box, or another structure in order to allow the thermal structure to utilize the climate control system 18 of the vehicle 12 to manage/control thermal properties inside of the cooler.

Figure 2:
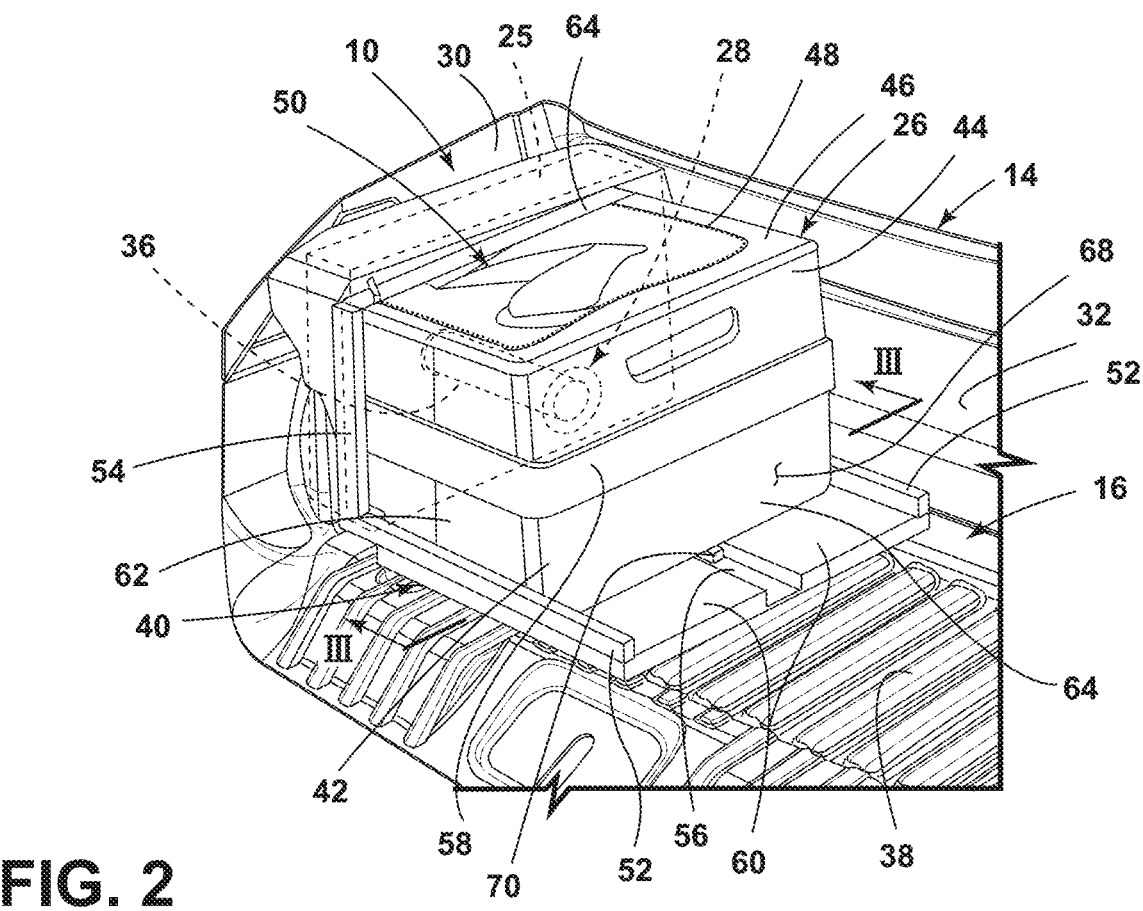
FIG. 2 is a perspective view of a container of a thermal management system coupled with a compartment of the vehicle according to one aspect of the present disclosure.
Figure 3:
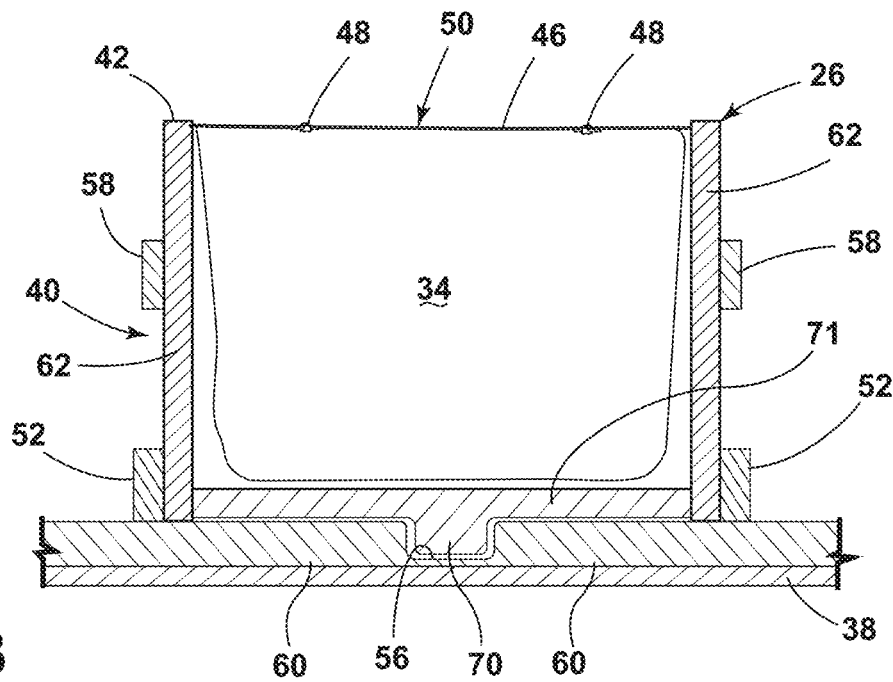
FIG. 3 is a cross-sectional view of the container and a stabilizer arrangement taken along the line III of FIG. 2.

Referring now to FIGS. 2 and 3, the thermal management system 10 includes a thermally insulated container 26, such as a cooler, selectively disposed within the compartment 14 and selectively coupled with a connection interface 28. The connection interface 28 may be disposed on a wall 30, 32 of the compartment 14, such as a lateral wall 30 (as depicted) or a back wall 32 of the compartment 14. The connection interface 28 may provide fluid communication between an interior 34 of the container 26 and the climate control system 18. In particular, this connection interface 28 may provide for fluid communication between the interior 34 and the heat control source 25 of the climate control system 18 via at least one conduit 36. In operation, cool air may be pumped into the compartment 14 or the container 26 and hot air may be drawn from the compartment 14 or the container 26 to reduce the temperature and/or draw heat from the container 26 or the compartment 14. In some examples, the connection interface 28 is configured to deliver cool air to the container 26 and be shut off or otherwise disconnected from the compartment 14 if the container 26 is removed from attachment with the connection interface 28.

With continued reference to FIGS. 2 and 3, the compartment 14 may further include a floor 38 extending from the wall 30, 32 and configured to support the container 26. A stabilizer assembly 40 may be provided in the compartment 14 for aligning the container 26 when the container 26 is being coupled with the fluid connection. For example, the stabilizer arrangement 40 may guide, or align, the container 26 as the container 26 is pushed toward the wall 30, 32 to couple with the connection interface 28. In other examples, the stabilizer arrangement further provides for guiding the container 26 between a retracted position, in which the container 26 is compressed to provide more space within the compartment 14, and an extended position in which the container 26 is expanded while remaining coupled with the wall 30, 32 to increase a volume of the interior 34 of the container 26. The container 26 may include a rigid support structure 42 about a periphery 44 of the container 26 and a flexible, or elastic casing 46 disposed within the support structure 42. Further, a closure member, or clasping member 48, may be coupled with a top portion 50 of the container 26 to selectively open and close the container 26 to seal the interior 34.

Still referring to FIGS. 2 and 3, the stabilizer arrangement 40 may include at least one alignment feature 52, 54, 56, 58 configured to engage or otherwise interact with the container 26. For example, the alignment feature 52, 54, 56, 58 may include a pair of rails 52 extending from the floor 38 of the compartment 14, at least one brace 54 extending from the wall 30, 32 of the compartment 14, and a groove 56 formed in the floor 38 of the compartment 14. Other alignment features may be provided to sufficiently align the container 26 with the fluid connection between retracted and expanded positions, as well as between connected and disconnected positions. It is further contemplated that the floor 38 of the compartment may include interposing paneling 60 disposed underneath the container 26 and fixed with the floor 38 that serves to define the groove 56. Stated differently, the floor 38 of the compartment 14 may be a specific region of the floor 38 (e.g., a raised platform) that provides for the groove 56, with the structural portion of the compartment 14 being free from indentations. In this example, the groove 56 is provided via paneling, or platforms situated on the structural portion of the compartment 14, though the groove 56 may be formed directly in the floor 38 in some examples.

Figure 6:
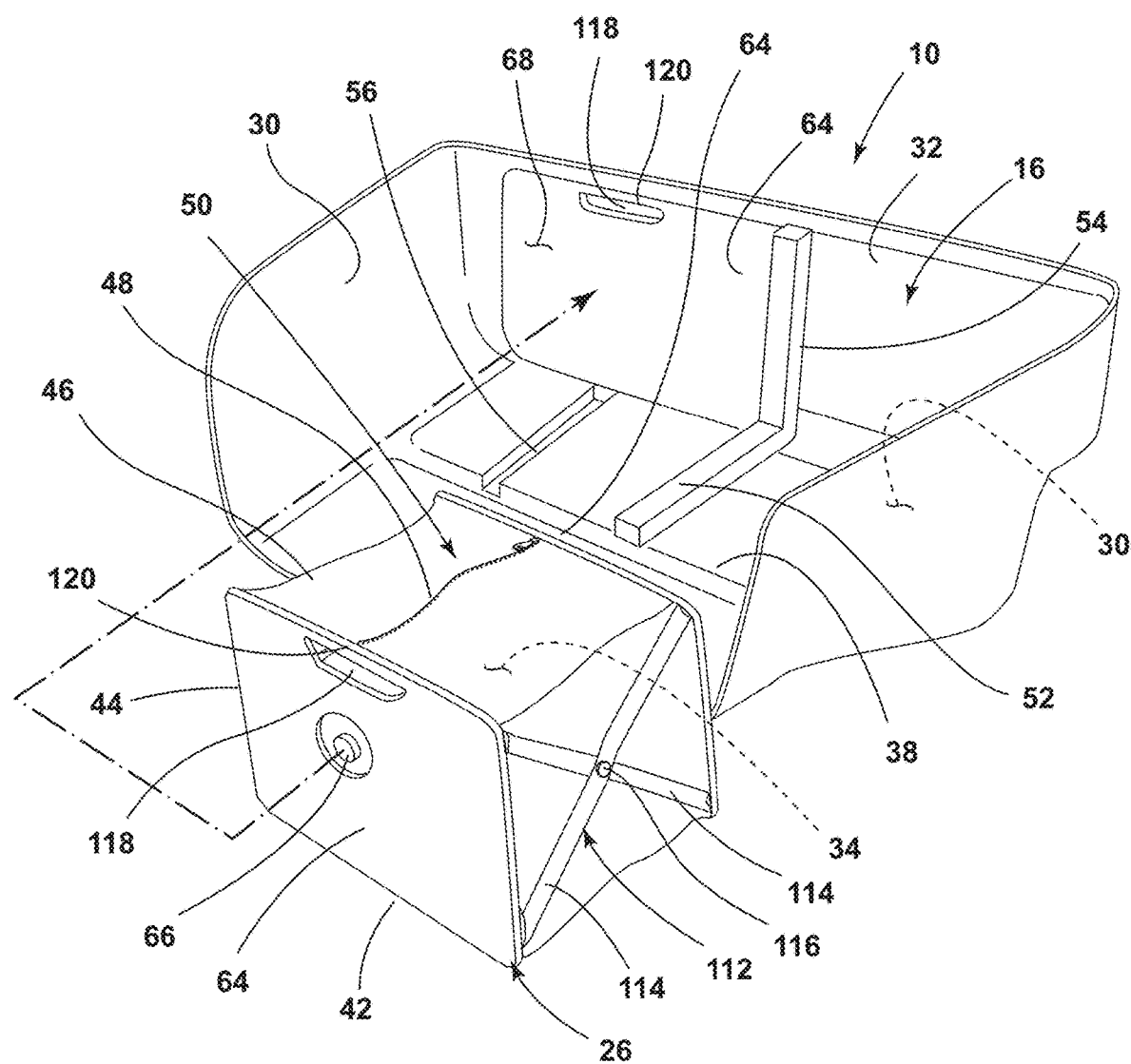
FIG. 6 is a top perspective view of the thermal management system with a container of the thermal management system shown in both a decoupled position and a coupled position, shown in phantom.

The pair of rails 52 may extend upwardly from the floor 38 and in a generally lateral direction parallel with a motion of the container 26 during coupling or decoupling or retraction/expansion with the wall 30, 32. The pair of rails 52 may engage at least one sidewall 62 of the container 26 to align the container 26 with the connection interface 28. The at least one sidewall 62 may include a pair of opposing sidewalls 62 that extend between two end panels 64 of the container 26. For example, as will be described further herein with reference to the proceeding figures, the container 26 may have a pair of end panels 64 that are rigid or made of semi-rigid material and are interconnected via the casing 46 previously described. It is further contemplated that the pair of opposing sidewalls 62 may interconnect the end panels 64 and may fold up or otherwise compress. At least one coupling 66 may be provided on an external surface 68 of one of the end panels 64 for coupling with the connection interface 28 (FIG. 6).

Referring particularly to FIG. 2, the at least one brace 54 may extend generally vertically, or perpendicular, to the pair of rails 52 and along the wall 30, 32 to align the container 26 at the connection interface 28. For example, the at least one brace 54 may engage the opposing sidewalls 62 along the wall 30, 32 and align the container 26 along the height of the container 26 to limit tipping of the container 26 in vehicle-forward or vehicle-rearward directions. It is further contemplated that the alignment features 52, 54, 56, 58 may also include a band 58, such as an elastomeric strap that couples with the wall 30, 32 and is configured to stretch away from the wall 30, 32 as the container 26 is moved from the retracted position to the extended position. The strap may have a tensioned winding within the wall 30, 32 to provide tension to the strap, such that the band 58 serves to hug at least one of the end panels 64 and the at least one sidewall 62 to maintain connection of the container 26 with the connection interface 28.

Referring more particularly to FIG. 3, a guide 70, or protrusion, may extend from a lower wall 71 of the container 26 for engaging or being disposed in the groove 56 of the floor 38 of the interposing paneling 60. The guide 70 and groove 56 arrangement may limit movement of the container 26 from side to side when moving between extended and retracted positions and when being coupled or decoupled with the compartment 14. Together with the pair of rails 52, the at least one brace 54, and the band 58, the stabilizer arrangement may allow for efficient securing of the container 26 in the compartment 14 and provide for ease of installation and removal of the container 26 with the compartment 14.

Figure 4:
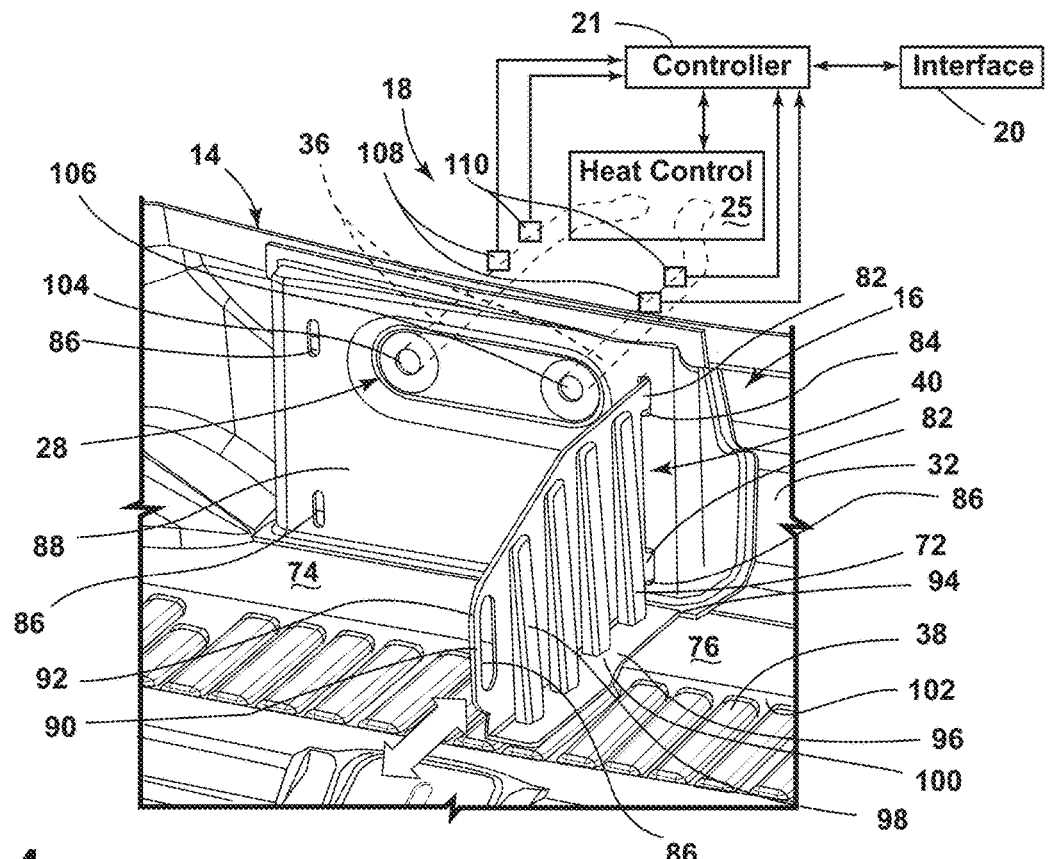
FIG. 4 is a perspective view of a compartment of a vehicle with a container of the thermal management system removed from the compartment.
Figure 5:
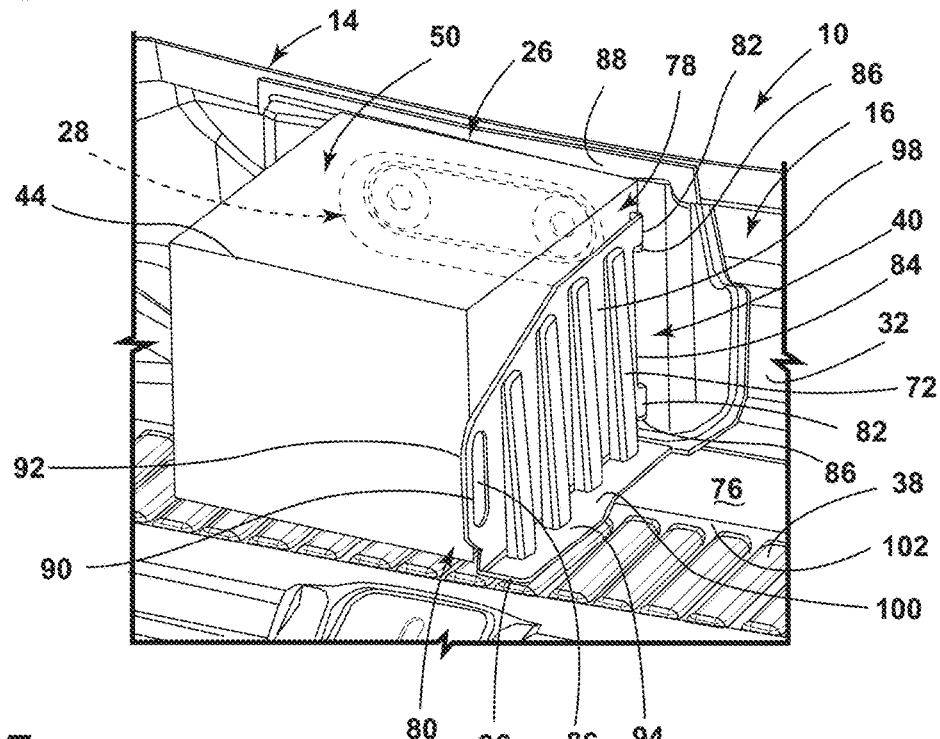
FIG. 5 is a perspective view of the compartment of FIG. 4 with a container of the thermal management system disposed in the compartment.

Referring now to FIGS. 4 and 5, the stabilizer arrangement 40 may further include a divider 72, or dividing panel, that couples with the wall 30, 32 of the compartment 14 to provide stability to the container 26 when the container 26 is coupled with the connection interface 28. As illustrated in FIGS. 4 and 5, the connection interface 28 may be disposed along the back wall 32 of the compartment 14. In this example, the divider 72 serves to divide the space 16 into a first region 74 for the container 26 and a second region 76 on the other side of the divider 72. As shown, the divider 72 may be substantially planar and be configured to engage the at least one sidewall 62 of the container 26 along an upper portion 78 of the sidewall 62 in addition to along a lower portion 80 of the sidewall 62. The divider 72 may include at least one extension 82 that extends from a back edge 84 of the divider 72 to engage at least one notch 86 formed in the sidewall 62, or formed in a fixed plate 88 mounted to the back wall 32. In some examples, the at least one extension 82 includes a pair of extensions 82 and the notch 86 includes a pair of notches 86 for receiving the pair of extensions 82. It is also contemplated that a second divider (not pictured) may be disposed on an opposing side of the connection interface 28 for engaging another of the opposing sidewalls 62 of the container 26. It is contemplated that the divider 72 may be selectively coupled with the sidewall 62 via a lifting motion accomplished by grasping a grip 90 adjacent to a front edge 92 of the divider 72 to lift the divider 72 from the compartment 14. It is contemplated that the divider 72 may be storable within the compartment 14 along with an indentation or may be otherwise folded inwardly with the plate 88 when the container 26 is not in use. For example, the extension 82 and notch 86 connection may alternatively be a hinged connection allowing pivoting of the divider 72 away from/toward the wall 30, 32. The divider 72 may also include a support plate 94 along a bottom edge 96 of the divider 72 and extending laterally outwardly from an upright 98 of the divider 72 to stabilize the divider 72. The divider 72 includes a lip 100 that is configured to mate with a ledge 102 of the floor 38 of the compartment 14. The lip 100 may serve to raise a height of the support plate 94 to allow the divider 72 to contact the floor 38 when the floor 38 is uneven. Thus, when the floor 38 includes a ledge 102, such as the ledge 102 depicted, the divider 72 may have continuous support, along the floor 38. In addition, the lip 100 and ledge 102 interaction may serve to lock divider 72 in a foldout position.

The particular reference to FIG. 4, the connection interface 28 is illustrated with an inlet port 104 and an outlet port 106 for the at least one conduit 36. A plurality of sensors 108, 110 may be provided along the at least one conduit 36 for monitoring a temperature associated with the conduit 36 and/or a pressure associated with the at least one conduit 36. In such examples, a temperature sensor 108 may be provided, in addition to a pressure sensor 110. In other examples, the plurality of sensors 108, 110 includes a flow rate sensor to monitor a rate of fluid flow between the heat control source 25 and the interior 34. It is contemplated that the plurality of sensors 108, 110 may be disposed along the at least one conduit 36 or disposed adjacent the connection interface 28 or the heat control unit 25.

In general, the plurality of sensors 108, 110 is configured to detect various environmental conditions associated with the interior 34 in order to determine whether the clasping member 48 is sealing the interior 34 (e.g., the container 26 is closed). The plurality of sensors 108, 110 may be in communication with the controller 21 previously described. Temperature data, pressure data, and/or flow rate data may be received by the controller 21. The controller 21 may be configured to determine an open or close state of the container 26 based on temperature data. For example, if cool air is being provided to the interior 34, but the temperature is not being sufficiently reduced as would be expected based on preprogrammed instructions, the controller 21 may determine that the clasping member 48 is not sealed and may communicate a signal to adjust the climate control system 18 to control the fluid communication to the interior 34. For example, the controller 21 may communicate an instruction to shut off cool airflow to the interior 34. In addition, the controller 21 may be configured to communicate a signal to the user interface 20 to notify the user that the container 26 is open or has been left open. In this way, the present thermal management system 10 may provide for efficient energy use and provide sufficient feedback for optimized cooling of items in the container 26. Although not depicted in detail, it is contemplated that the controller 21 may be in communication with the mobile device 24 and/or the vehicle HMI 22 via at least one network, such as a wireless network to allow communication of the signal to the interfaces 20.

It is contemplated that the divider 72 may serve to sandwich the container 26 between the divider 72 and the wall 30, 32 of the compartment 14. For example, the divider 72 may sandwich the container 26 between the divider 72 and the lateral wall 30 when the connection interface 28 is disposed along the back wall 32 of the compartment 14. Thus, the plate depicted in FIG. 5 may be disposed adjacent a corner of the compartment 14 to allow the container 26 to be stabilized in both lateral directions.

Referring now to FIG. 6, at least one rigid linkage 112 may be disposed between the end panels 64 of the container 26 to stabilize the casing 46 in an extended position of the container 26. The rigid linkage 112 may include a pair of crossing members 114 extending between the end panels 64 along each of the opposing sidewalls 62 of the container 26. Because the casing 46 may be flexible along the sidewalls 62, the crossing members 114 (e.g., cross-members) may add structural rigidity to the container 26 between the end panels 64. In this example, the rigid linkage 112 may provide for stability in the extended position. In addition, the crossing members 114 of the rigid linkage 112 may form a scissor linkage to bias the container 26 in the expanded position. The crossing members 114 may be coupled to one another, via a central axle 116 that allows rotation of the crossing members 114 relative to one another. Accordingly, as the container 26 may move from the extended position toward the retracted position, the crossing members 114 may fold up between the end panels 64. As illustrated in FIG. 6, each end panel 64 may define a through hole 118 that forms a holding member 120 for the user to manipulate the container 26 to move the container 26 between the retracted and extended positions and between the coupled and decoupled positions.

Incorporation of the present thermal management system 10 in a frunk of the vehicle 12 may provide for greater accessibility and ease of connection with an on-board HVAC system relative to cooperation with other compartments of the vehicle 12, such as the cabin, trunk, or bed of the vehicle 12. For example, the frunk may be proximate to a dashboard of the cabin in which at least one HVAC system of the vehicle 12 may be positioned. In addition, incorporation into the frunk of the vehicle 12 may allow for condensation, spillage, or other fluids to drain from the container 32 to exit the vehicle 12. Further, incorporation of the thermal management system 10 in an area separate from the cabin of the vehicle 12 may allow for selective access to a climate-controlled region separate from the cabin.

It is to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A thermal management system for a vehicle, comprising:
    a connection interface coupled with a compartment of the vehicle and in fluid communication with a climate control system of the vehicle;
    a container movably disposed in the compartment and in fluid communication with the climate control system via the connection interface; and
    at least one alignment feature coupled with the compartment and engaging at least one sidewall of the container to align the container with the connection interface while the container moves in the compartment, wherein the at least one alignment feature includes a divider extending from a wall of the compartment to divide the compartment and engage the sidewall along an upper portion of the sidewall.

2. The system of claim 1, wherein the container is configured to selectively engage the connection interface and is removable from the compartment.

3. The system of claim 1, wherein the at least one sidewall includes opposing sidewalls and the at least one alignment feature includes a pair of rails extending upwardly from a floor of the compartment for engaging the opposing sidewalls.

4. The system of claim 3, further comprising:
    a groove extending into the floor; and
    a guide extending from a bottom of the container for engaging the groove to align the container with the connection interface.

5. The system of claim 4, wherein the at least one alignment feature includes a brace extending outwardly from an outer wall of the compartment for engaging the opposing sidewalls.

6. The system of claim 4, further comprising:
    a band coupled with the compartment and configured to stretch around the container to bias the container toward the connection interface.

7. The system of claim 1, wherein the divider includes an extension and the compartment defines a notch configured to receive the extension to limit lateral movement of the divider.

8. The system of claim 1, wherein the divider further includes a lip configured to mate with a ledge disposed along a floor of the compartment.

9. The system of claim 8, wherein the container includes end panels, a casing extending between the end panels, and a rigid linkage between the end panels configured to stabilize the casing.

10. The system of claim 9, wherein the rigid linkage includes a pair of crossing members between the end panels along the at least one sidewall.

11. The system of claim 10, wherein the crossing members form a scissor linkage between the end panels to bias the container in an expanded position, the end panels spaced from one another in the expanded position.

12. The system of claim 1, wherein the container includes a clasping member configured to open and close the container to selectively seal an interior of the container.

13. The system of claim 12, wherein the climate control system includes a sensing device configured to detect one of a temperature and a pressure of the interior.

14. The system of claim 13, wherein the climate control system further includes:
    a controller in communication with the sensing device, the controller configured to determine an open state of the container based on one of the temperature and the pressure; and
    communicate an instruction to adjust the fluid communication with the container based on the open state of the container.

15. A stabilizer assembly of a vehicle for interaction with a portable cooler, comprising:
    a compartment having a wall;
    a connection interface coupled to the wall and configured to provide fluid communication between an interior of the portable cooler and a climate control system of the vehicle;
    at least one alignment feature coupled with the compartment and engaging at least one sidewall of the portable cooler to align the portable cooler with the connection interface during a movement of the portable cooler in the compartment; and
    a groove extending into the floor; and
    a guide extending from a bottom of the portable cooler for engaging the groove to align the portable cooler with the connection interface.

16. The stabilizer assembly of claim 15, wherein the portable cooler is configured to selectively engage the connection interface.

17. The stabilizer assembly of claim 15, wherein the at least one sidewall includes opposing sidewalls and the at least one alignment feature includes a pair of rails extending upwardly from a floor of the compartment for engaging the opposing sidewalls.

18. A thermal management system for a vehicle, comprising:
- a climate control system including a conduit providing fluid communication between a compartment of the vehicle and a heat control source in the vehicle;
- a connection interface interposing the conduit and the compartment;
- a thermally insulated container movably coupled with the compartment and configured to couple with the connection interface to provide fluid communication between an interior of the container and the climate control system; and
- a pair of rails extending upwardly from a floor of the compartment for engaging opposing sidewalls of the container to align the container with the connection interface during a movement of the container in the compartment.

19. The thermal management system of claim 18, further comprising:
- a groove extending into the floor; and
- a guide extending from a bottom of the container for engaging the groove to align the container with the connection interface.

20. The thermal management system of claim 18, wherein the container is configured to selectively engage the connection interface and is removable from the compartment.

\* \* \* \* \*